(12) United States Patent
Umbricht et al.

(10) Patent No.: US 10,393,492 B2
(45) Date of Patent: Aug. 27, 2019

(54) DIGITAL WIRELESS FEELER GAUGE

(71) Applicant: General Electric Company, Schenectady, NY (US)

(72) Inventors: Walter Umbricht, Gebenstorf (CH); Benno Basler, Dulliken (CH); Daniel Rawyler, Collombey (CH); David Wäckerlin, Champagne (CH); Hans Ulrich Meyer, Morges (CH)

(73) Assignee: General Electric Company, Schenectady, NY (US)

( * ) Notice: Subject to any disclaimer, the term of this patent is extended or adjusted under 35 U.S.C. 154(b) by 50 days.

(21) Appl. No.: 15/381,090

(22) Filed: Dec. 15, 2016

(65) Prior Publication Data

US 2018/0172417 A1    Jun. 21, 2018

(51) Int. Cl.
  *G01B 3/30*    (2006.01)
  *G01B 5/02*    (2006.01)
  *G01B 11/06*   (2006.01)

(52) U.S. Cl.
  CPC .............. *G01B 5/02* (2013.01); *G01B 3/30* (2013.01); *G01B 11/06* (2013.01)

(58) Field of Classification Search
  CPC ... G01B 3/30; G01B 3/46; G01B 3/50; G01B 5/14
  USPC ................................. 33/501.6, 613
  See application file for complete search history.

(56) References Cited

U.S. PATENT DOCUMENTS

| | | | | |
|---|---|---|---|---|
| 2,579,386 | A * | 12/1951 | Koenig ............... | G01B 3/30 33/562 |
| 4,498,239 | A * | 2/1985 | Epstein ............... | G01B 3/32 33/567 |
| 4,606,129 | A * | 8/1986 | Barrowman ......... | G01B 7/31 33/501.09 |
| 5,657,550 | A * | 8/1997 | Struble .............. | G01B 5/14 33/544.4 |
| 6,279,241 | B1 * | 8/2001 | Chen .................. | G01B 3/30 33/199 R |
| 6,886,267 | B1 * | 5/2005 | Karwowski ......... | G01B 5/14 33/501.45 |
| 8,832,951 | B2 * | 9/2014 | Oode .................. | G01B 7/06 33/501.45 |
| 8,919,004 | B2 | 12/2014 | Wu et al. | |
| 10,046,456 | B2 * | 8/2018 | Byrt .................... | G01B 3/30 |

(Continued)

FOREIGN PATENT DOCUMENTS

EP    2 620 740 A1    7/2013

OTHER PUBLICATIONS

Extended European Search Report and Opinion issued in connection with corresponding EP Application No. 17207600.2 dated Apr. 18, 2018.

*Primary Examiner* — Christopher W Fulton
(74) *Attorney, Agent, or Firm* — Fletcher Yoder P.C.

(57) ABSTRACT

A feeler gauge includes multiple feeler blades and an optical sensor. Each of the multiple feeler blades rotates about an axis between a measuring position and a non-measuring position. Each of the multiple feeler blades includes a measurement portion configured to be inserted into a gap to be measured and a proximal end having an indication of thickness of the respective feeler blade thereon. The optical sensor optically determines one or more of the multiple feeler blades that are deployed in the measuring position from the respective indications of thickness of each of the one or more feeler blades.

17 Claims, 4 Drawing Sheets

(56) References Cited

U.S. PATENT DOCUMENTS

| | | | |
|---|---|---|---|
| 2005/0257392 A1* | 11/2005 | Wood | G01D 5/35303 33/613 |
| 2008/0115379 A1* | 5/2008 | Park | B60J 10/00 33/613 |
| 2015/0096183 A1* | 4/2015 | Laflen | G01B 5/14 33/531 |

* cited by examiner

DIGITAL WIRELESS FEELER GAUGE

BACKGROUND

The subject matter disclosed herein relates to gauges used for measuring gaps or clearances, and more particularly to digital feeler gauges for measuring, recording, and/or transmitting gap or clearance data.

Feeler gauges are widely used in many industrial settings. For instance, feeler gauges may be used in coupled rotating equipment such as gas, steam, wind, and hydro turbine systems, to precisely measure gaps or clearances. The accuracy of measurements of gaps and clearances may be particularly important. For example, regular maintenance, vibration mitigation, and process optimization in the gas turbine systems and other industrial settings may rely heavily on accuracy of measurements of such gaps or clearances. The feeler gauge is typically a hand-held device having several stacked, elongated feeler blades, having a variety of thicknesses. One or more of the feeler blades may be extended into a measuring position and used to measure the thickness of a gap or clearance. The measurement is then typically determined and recorded by the user of the feeler gauge. The manual nature of typical feeler gauges leaves room for human error in measuring, recording, and relaying the gap information and does not enable quick electronic access to current and trending gap data. Moreover, human error may occur when a wrong gap or clearance is measured, with possibly costly consequences for the next working step.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a feeler gauge includes multiple feeler blades and an optical sensor system. Each of the multiple feeler blades rotates about an axis between a measuring position and a non-measuring position. Each of the multiple feeler blades includes a distal end configured to be inserted into a gap to be measured and a proximal end having an indication of thickness of the respective feeler blade thereon. The optical sensor optically determines one or more of the multiple feeler blades that are deployed in the measuring position from the respective indications of thickness of each of the one or more feeler blades.

In a second embodiment, a tangible, non-transitory, and computer-readable medium contains instructions stored thereon. When executed on a processor, the instructions are configured to cause the processor to receive a signal from an optical sensor indicative of one or more feeler blades of a feeler gauge that are deployed in a measuring position. The instructions also cause the processor to determine an overall thickness of the one or more feeler blades based at least in part on the signal. Further, the instructions cause the processor to cause display of the overall thickness via an electronic display.

In a third embodiment, a feeler gauge configured to measure a thickness of a gap includes a housing and multiple feeler blades. The multiple feeler blades are configured to rotate about an axis between a measuring position and a housed position. Each of the feeler blades of the multiple feeler blades includes an optical indication of thickness of the respective feeler blade. The feeler gauge includes an optical sensor configured to detect the optical indications of thickness and an orientation sensor configured to detect an orientation of the feeler gauge. The feeler gauge includes a display configured to display an overall thickness of feeler blades of the multiple feeler blades that are in the measuring position.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide feeler gauges for measuring gaps, clearances, spaces, and the like in various environments (e.g., gas turbine systems). It should be understood that feeler gauges may be used in any setting where gap and/or clearance measurements are needed. The disclosed embodiments include feeler blades having indications of thickness that may be read or determined by an optical sensor of the feeler gauge. The feeler gauge may be configured to determine an overall thickness of a measured gap or clearance when one or more feeler blades are used for a measurement. The feeler gauge may be configured to recognize the orientation of the feeler gauge via an orientation sensor, which may indicate a position or location about a gap that may be measured. The feeler gauge may be configured to display the gap measurement data and/or wirelessly transmit the gap data to remote computing device or devices. Moreover, the measurement data may be transmitted to cloud storage or calculation platforms (e.g. iCloud, Predix) for access by any user.

Figure 1:
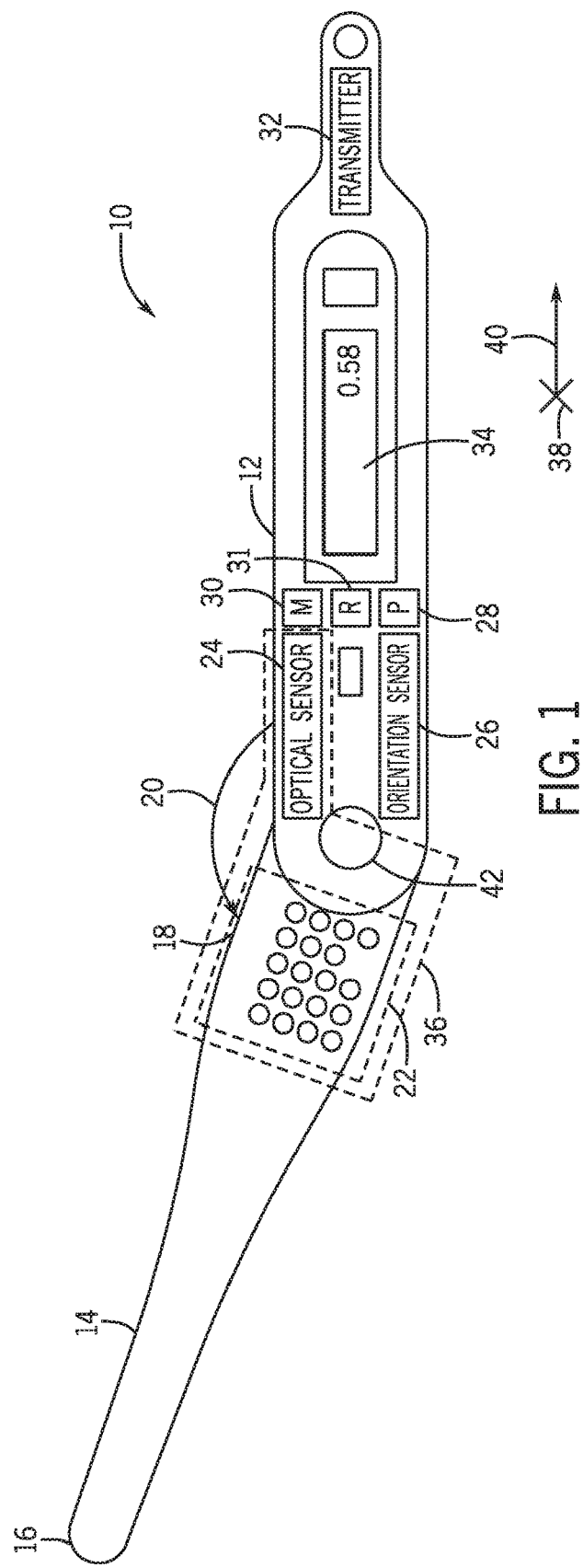
FIG. 1 is a top view of an embodiment of a feeler gauge having optical indications of thickness on each respective blade.

Now turning to the drawings, FIG. 1 is a side view of an embodiment of a feeler gauge 10. The feeler gauge 10 may include multiple feeler blades 14 configured to measure a gap or clearance and a housing 12 configured to house the feeler blades 14 that are not extended into a measuring position. The feeler blades 14 that are deployed in the measuring position may be indirectly determined by first determining which feeler blades 14 have not been deployed. The multiple feeler blades 14 may be flat, flexible, elongated lengths, each having a variety of thicknesses and are arranged in a logic that allows precise measurements of the gaps. The number, shape, length, and particular thicknesses of the feeler blades 14 provided in an embodiment of the feeler gauge 10 may vary based on various factors, such as a location or a type of gap or clearance to be measured using the feeler gauge 10. For example, for measuring a coupling gap for rotors of a gas and steam turbine system, the feeler gauge 10 may include any number (e.g., thirteen) of feeler blades 14 of a specific length (e.g., 140 mm long) feeler blades 14 with varying thicknesses. In some embodiments, the thicknesses of the feeler blades 14 may include 0.40 mm, 0.50 mm, 0.60 mm, 0.61 mm, 0.62 mm, 0.63 mm, 0.64 mm, 0.65 mm, 0.70 mm, 0.66 mm, 0.67 mm, 0.68 mm, 0.69 mm. However, any combination of feeler blade 14 thicknesses may be selected for general or specific use in a specific field of measurements (e.g., gas turbines). For example, the feeler blade 14 thicknesses may be selected in such a way that only 2 blades at the time are necessary for coupling parallelism measurements. In some embodiments, the feeler blades 14 may be stacked in a graduating thickness arrangement. In some embodiments, the feeler blades 14 may be stacked in a particular way to optimize the accuracy of the measurement. In some embodiments, the thickest feeler blades 14 may be located toward a middle of the feeler gauge 10 due to reduced flexibility resulting from greater thickness. The feeler blades 14 may have varying thicknesses. In some embodiments, at least some of the feeler blades 14 may have the same thickness. In other embodiments, each feeler blade 14 has a different thickness. The change in thicknesses between feeler blades 14 may be incrementally consistent or may vary by increments. The increments (e.g., 0.01 mm) in thickness between the separate feeler blades 14 may enable greater accuracy of measurement. As previously noted, the feeler blades 14 of the feeler gauge 10 may include any number of feeler blades 14 and any length of feeler blades 14. In some embodiments, the feeler blades 14 may be adopted to a length suitable for measurements at locations that are further inside an outer gap. In some embodiments, the feeler blades 14 may reflect a combination of different measuring ranges in order to extend the range of gaps that can be measured with one instrument.

Each feeler blade 14 may have a distal end 16 configured to be inserted into a gap and a proximal end 18. Additionally or alternatively, any portion (e.g., a side) of the feeler blade 14 may be inserted in to a gap to be measured. The proximal end 18 includes an indication of thickness 22. The indications of thickness 22 may be any of several types of indicators. In the illustrated embodiment, the indications of thickness 22 of the feeler blades 14 may be a series of holes that form a grid. In this configuration, there may be a space or portion in the grid missing or filled in on each feeler blade 14 indicating the thickness of the respective feeler blade 14.

The indications of thickness 22 may be any other type of indicator, such as barcodes, quick response (QR) codes, a series of bumps or ridges, or any other form that translates into binary information. The indications of thickness 22 of the feeler blades 14 may be configured to be optically scanned by an optical sensor 24 of the feeler gauge 10. The optical sensor 24 may be positioned in the housing 12 of the feeler gauge 10 and in combination with the indications of thickness 22 of the feeler blades 14 may be included as part of a thickness detection system 36 of the feeler gauge 10. The thickness detection system 36, as discussed below in reference to FIG. 2, may be configured to optically scan the indications of thickness 22 of the feeler blades 14 using the optical sensor 24 to determine which one or more feeler blades 14 of the feeler gauge 10 are in the measuring position, indicating the thickness of a gap. An orientation code (e.g., R, L and T) may be shown on the display until the value is sent to the device or cloud storage or Predix.

The feeler gauge 10 may include an orientation sensor 26 (e.g., a gyroscope) that may be configured to detect the orientation of the feeler gauge 10 when one or more feeler blades 14 are in the measuring position. In some embodiments, the orientation sensor 26 may be located at any location in the housing 12 of the feeler gauge 10. Using the detected orientation, the feeler gauge 10 can ensure that the feeler gauge 10 is in a measurement orientation that corresponds to a measurement that is currently being taken. In other words, the feeler gauge 10 can ensure that measurements are taken at the proper location and in a proper manner.

The feeler gauge 10 may include a processor 28, a memory 30, a receiver 31 and a transmitter 32 and may be configured to display the gap thickness via an electronic display 34 and transmit the thickness data and/or orientation data to a remote computing device using a wireless connection. The memory 30 may include tangible, non-transitory, and computer-readable medium, such as read-only memory (ROM) or random-accessible memory (RAM). The memory 30 contains instructions that may be executed on the processor 28. The instructions, when executed, cause the processor 28 to receive a signal from the optical sensor 24 that may indicate the one or more feeler blades 14 of the feeler gauge 10 that may be in the measuring or extended position. The instructions may cause the processor 28 to determine an overall thickness of the one or more feeler blades 14 in the measuring position. The processor 28 makes this determination based at least in part on the signal received from the optical sensor 24 indicating the one or more feeler blades 14 that are extended in the measuring position (e.g., not in the housed position). The determination of the overall thickness of the one or more feeler blades 14 that may be in the measuring position may include looking up the overall thickness in a lookup table stored in the memory 30 based at least in part on the signal from the optical sensor 24. The memory 30 may also be used to store measurements. The memory 30 may also be expandable and/or replaceable. For example, the memory 30 may include a memory stick (e.g., flash drive) that may be removably inserted into the feeler gauge 10. The receiver 31 will enable the processor 28 of the feeler gauge 10 to create and display messages to the user via display 34 on what is the next measuring point, location, orientation, expected value(s), and other relevant information to assist the operator in the use of the feeler gauge. In certain embodiments, the processor 28 may be configured to determine whether the housed feeler blades 14 are in a position (e.g., fully inside the housing) such that the respective possible hole location(s) 56 of the indications of thickness 22 of each feeler blade 14 are aligned for proper measurement. One way for the processor 28 to ensure that the housed feeler blades 14 are fully in the housed position is for the width and shape of the housing 12 to be contoured to the width and/or shape of the feeler blades 14 when in the housed position. The processor 28 may be configured to cause display of an error message via the display 34 if it is determined that one or more feeler blades 14 not in the measuring position is not fully in the housed position. The processor 28 may determine that one or more feeler blades 14 are not fully in the measuring position by registering that received light at sensors does not exceed a threshold (e.g., less than 90% of the brightness transmitted into the hole locations).

Since the indications of thickness 22 of the feeler blades 14 may include any type of indicator configured to be optically scanned, such as grids of holes, barcodes, quick response (QR) and Radio Frequency Identification (RFID) codes, or a series of bumps or ridges, the determination of the overall thickness of the feeler blades 14 in the measuring position may include decoding the signal from optically scanned barcodes or quick response (QR) and RFID codes. The instructions stored in the memory 30 may cause the processor 28 to cause the display of the determined overall thickness of the one or more feeler blades 14 extended in the measuring position via the electronic display 34. Additionally or alternatively, the processor 28 may determine whether a determined orientation via the orientation sensor 26 matches an expected measurement orientation. When the determined orientation does not match an expected measurement orientation, the processor 28 may cause the electronic display 34 to display an indication that the orientation is incorrect. For example, an indicator such as an exclamation point, an X, or any other symbol may be used to indicate that the orientation is not as expected, or the displayed value may be blinking.

The instructions may further cause the processor 28 to cause transmission of the overall thickness and/or orientation data to a remote computing device via a wireless connection. The wireless connection may be an 802.11 wireless connection, an 802.15.4 wireless connection, a Bluetooth wireless connection, a Bluetooth low energy (BLE) wireless connection, or any combination thereof.

The housing 12 may include a hinge 42 at one end configured to rotatably couple the multiple feeler blades 14 to the housing 12. The hinge 42 enables each feeler blade 14 to independently rotate around a common axis 38 between a non-measuring (e.g., housed position) and a measuring (e.g., extended position). In this manner, one or more feeler blades 14 may be rotated into a measuring position outside of the housing 12. If multiple feeler blades 14 are extended into a measuring position, their respective thicknesses may be combined to provide the precise measurement of the gap. In some embodiments, the feeler gauge 10 may include a brake or arrestor within housing 12 configured to block non-measuring feeler blades 14 inside housing 12.

Figure 2:
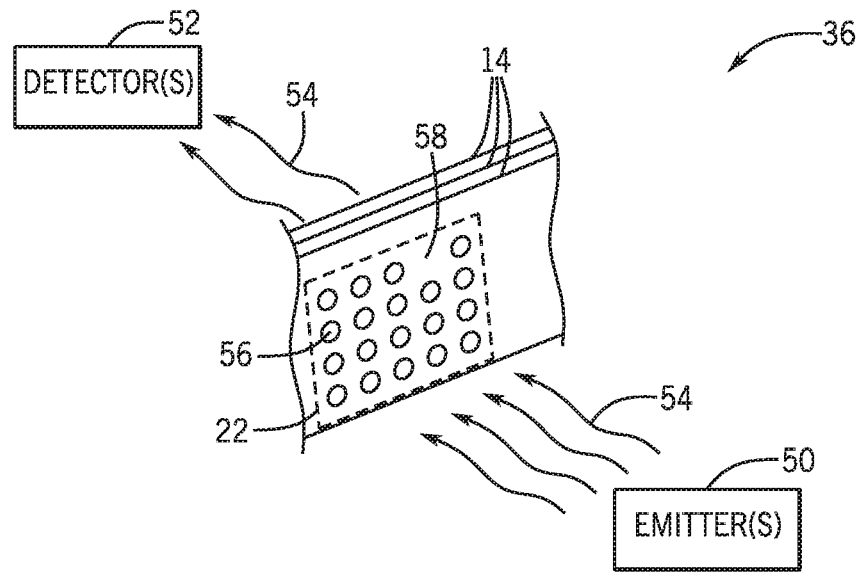
FIG. 2 is a cross-sectional view of an embodiment of a thickness detection system of the feeler gauge of FIG. 1.

FIG. 2 is a cross-sectional view of a thickness detection system 36 of the feeler gauge 10. The thickness detection system 36 may be configured to detect and determine the thickness of the one or more feeler blades 14 that may be in the measuring position. As previously noted, the thickness detection system 36 may include the indications of thickness 22 of the feeler blades 14 and the optical sensor 24. The optical sensor 24 may include one or more emitters 50 configured to emit light 54 and one or more detectors 52 configured to detect light 54. In some embodiments, one emitter 50 may be configured to emit light 54 that may pass through any of the possible hole locations 56 of the indications of thickness 22 of the feeler blades 14 in the housed position. In some embodiments, the optical sensor 24 may include multiple emitters 50 where each is located in a position configured to emit light 54 to one of the possible hole locations 56 of the grid of holes of the indications of thickness 22. The one or more detectors 52 may be configured to detect any light 54 that may pass through the possible hole locations 56 of feeler blades 14 that may be in a non-measuring or housed position in housing 12 of feeler gauge 10. When light does not pass through a possible hole location 56, the processor 28 determines that a corresponding feeler blade 14 may be considered to be in the housed position. When light is received through a possible hole location 56, the processor 28 may determine the overall thickness of the one or more feeler blades 14 that may be in the measuring position. The processor 28 may be configured to determine that a particular feeler blade 14 is in the measuring position even if only a percentage of light 54 transmitted by the one or more emitters 50 is detected by the detectors 52 through a possible hole location 56. In this manner, if a particular percentage less than 100% (e.g. greater than 90%) of the emitted light 54 is detected through a possible hole location 56 the processor may determine that the respective feeler blade 14 is in the measuring position and include the respective width of the feeler blade 14 in the determination of overall thickness.

In the illustrated embodiment, the indications of thickness 22 may include a grid of holes at a location (e.g., proximal end 18) on each feeler blade 14. Within the grid of holes, each feeler blade 14 may have one or more missing hole positions or obstructions 58 (i.e., a possible hole location of the grid that is solid, filled in, and/or not punched out) on each feeler blade 14. This grid location may be mapped to a thickness by the processor 28. In this manner, each feeler blade 14 may have a different missing hole position 58 or positions. When the one or more emitters 50 of the optical sensor 24 emit light 54, the missing hole positions 58 in the grid of each non-measuring or housed feeler blade 14 may block the emitted light 54 from reaching the detectors 52. When all feeler blades 14 are in the non-measuring or housed position, the missing hole position or positions 58 of all of the feeler blades 14 may block the light 54 emitted from the one or more emitters 50 from being detected by the one or more detectors 52 or the optical sensor 24. When one or more feeler blades 14 are in the measuring position and not housed in the housing 12 of the feeler gauge 10, the light 54 emitted from the one or more emitters 50 may pass through the remaining possible hole locations 56 of the housed feeler blades 14 at the missing hole position or positions 58 of the feeler blades 14 that are in the measuring position. The one or more detectors 52 may detect any light 54 that passes through. The position of the detected light indicates the thickness of the one or more feeler blades 14 that are in the measuring position.

As noted, the indications of thickness 22 may be a grid of holes as in the illustrated embodiment. Additionally or alternatively, the indications of thickness 22 may be any other type of indicator, such as barcodes, quick response (QR) or RFID codes, or a series of bumps or ridges that may be configured to be optically scanned by the optical sensor 24 of the feeler gauge 10 to result in unique binary values.

Figure 3:
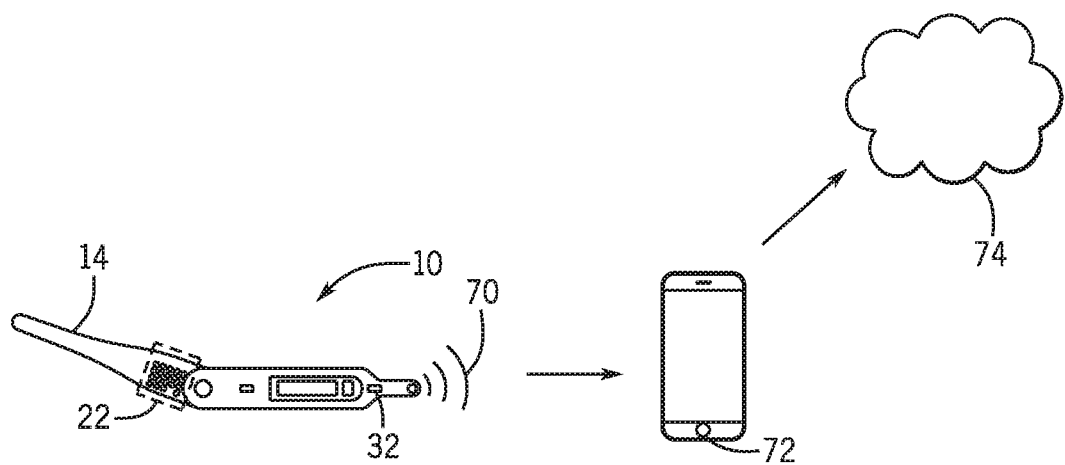
FIG. 3 is a schematic diagram of the transmission of gap measurement data from the feeler gauge of FIG. 1 via a wireless connection.

FIG. 3 is a schematic diagram of the transmission of gap measurement data from the feeler gauge 10. Feeler gauge 10 may include a transmitter 32 configured for wireless transmission 70 of a determined gap thickness. The transmitter 32 may wirelessly transmit gap measurement data to a remote computing device 72. The computing device 72 may be a mobile device, a router, or any other type of computing device. The computing device 72 may then transfer the measurement data to a cloud platform 74. The cloud platform 74 may include data storage, such as iCloud, or data calculation software, such as Predix applications. From the cloud platform, trending data from previous measurements may be downloaded remotely and may indicate current gap measurement trends, errors, and when changes may have occurred. The computing device may also be a local machine such as a PC, Laptop or other combination of computing and storage devices to perform the same functionality, including the transmission capability to the cloud.

A computing device (e.g., computing device 72) may generate, receive, and/or display a test sheet (e.g., electronic test sheet) for the feeler gauge 10. The test sheet may indicate a location where a gap measurement is to be made. In some embodiments, when the measurement is made, the transmitter 32 of feeler gauge 10 may wirelessly transmit the gap measurement data to the computing device 72 through which the test sheet was received. However, the transmitter 32 of the feeler gauge 10 may transmit the gap measurement data to any computing device configured to receive the measurement data. In some embodiments, the computing device receiving and/or displaying the test sheet may transmit a measurement orientation to the feeler gauge 10 to ensure that the feeler gauge 10 is oriented in the proper position when measurements are made. The processer 28 may then ensure that the measurement is taken in the proper orientation. As previously noted, in some embodiments, the feeler gauge 10 may also contain the receiver 31 to receive back information, such as the location of the next measurement or previous information recorded on the same location. Such information may then be used to detect trends or ensure consistent quality of the measurements.

The wireless transmission 70 from the transmitter 32 of the feeler gauge 10 to the computing device 72 may be performed via a wireless connection. As previously noted, the wireless connection used for the wireless transmission 72 may be an 802.11 wireless connection, an 802.15.4 wireless connection, a Bluetooth wireless connection, a Bluetooth low energy (BLE) wireless connection, or any combination thereof.

Figure 4:
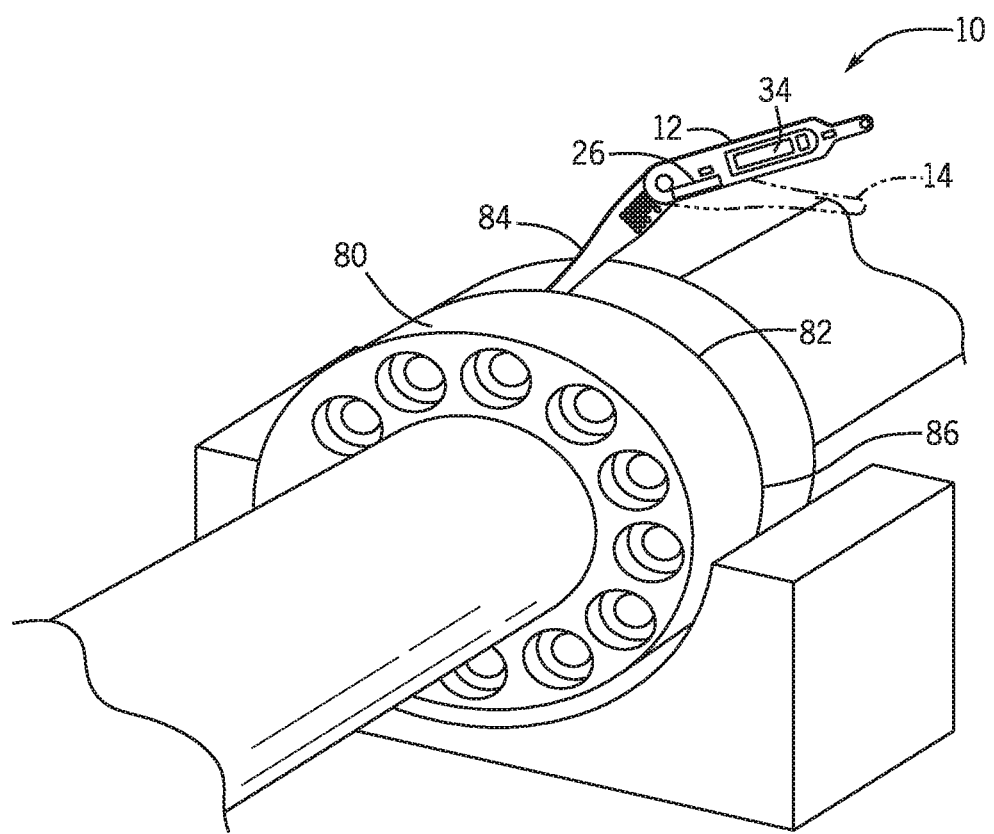
FIG. 4 is a perspective view the feeler gauge of FIG. 1 being used to measure a coupling gap.

FIG. 4 illustrates an embodiment of the feeler gauge 10 that may be utilized to measure a coupling gap 82 of a coupling 80. The coupling 80 and coupling gap 82 may be found in any industrial setting, such as a gas and steam turbine system. The feeler gauge 10 may be used to measure any other gaps or clearances. In the illustrated embodiment, the feeler gauge 10 may be used to measure the coupling gap 82 at a position at the top of the coupling 80. In this manner, the measuring feeler blade or blades 84 of the feeler gauge 10 may be inserted into the coupling gap 82 in a vertical position. The user of the feeler gauge 10 may receive a test sheet on a computing device 72 such as a phone or tablet. The electronic test sheet may indicate the location to be measured, such as coupling gap 82, and the position on the coupling gap 82 where the measurement may be expected to be made. The computing device 72 may, in some embodiments, send such information to the feeler gauge 10. The position on the coupling gap 82 where the measurement may be expected to be made may be at the top of the coupling 80, as in the illustrated embodiment, with the measuring feeler blade or blades 84 in a vertical position, or any other position around the coupling 80. The position on the coupling gap 82 where the measurement may be expected to be made may be along the side of the coupling 80 in a position 86 of the illustrated embodiment. When measuring at this position 86, the measuring feeler blade(s) 84 may be inserted into the coupling gap 82 in a horizontal position.

In some embodiments, the feeler gauge 10 may include an orientation sensor 26, such as a gyroscope. The orientation sensor 26 may be able to recognize the positioning of the feeler gauge 10 at the time a measurement is taken, indicating the location around the coupling gap 82 that is being measured. In this manner, the orientation sensor 26 of the feeler gauge 10 may recognize if the measuring feeler blade 84 is oriented such that the measurement is being taken from a location at the top of the coupling gap 82, as in the illustrated embodiment, or at a location on the side of the coupling gap 82, such as at position 86. The test sheet may indicate the location that may be expected to be measured about the coupling gap 82. The orientation sensor 26 of feeler gauge 10 may recognize if the orientation of the feeler gauge 10 matches the location indicated to be measured on the test sheet. The orientation of the feeler gauge 10 when a measurement is being made may depend on the position of the one or more feeler blades 14 when extended into the measuring position. The feeler blades 14 may be extended to any position relative to the housing 12 of the feeler gauge 10. In order for the orientation sensor 26 to accurately recognize the orientation of the feeler gauge 10 when a measurement is being taken, the one or more measuring feeler blades 84 may be extended to a specified angle from the housing 12 of feeler gauge 10. The specified angle may be indicated on the test sheet, or it may be specified in any other manner. For example, the angle may be set using an input by the user of the feeler gauge 10 before a measurement is taken or set as a user preference before the feeler gauge 10 is utilized in the field. Additionally or alternatively, a calibration mode may be entered where the feeler gauge 10 asks, via the electronic display 34 or the computing device 72, for a vertical test and a horizontal test to determine an angle that corresponds to a specific user.

The orientation sensor 26 of the feeler gauge 10 may alert the user if the processor 28 recognizes that the orientation of the feeler gauge 10 does not match the orientation and/or location specified in the test sheet. The alert may by displayed on the test sheet on the computing device 72 and/or may be displayed on the electronic display 34 of the feeler gauge 10, signaling that the feeler gauge 10 may need to be repositioned in order to measure the coupling gap 82 at the expected location. In some embodiments, the feeler gauge 10 may include an audio alert, such as a speaker buzzer, Piezoelectric speaker/buzzer, or other suitable audial generators to indicate a mismatch between a measured orientation and one indicated in the test sheet. This audial or visual alert may be generated when the processor 28 determines that a mismatch has occurred. Additionally or alternatively, when a gap measurement is made, the location of the measurement about the coupling gap 82 or any other gap or clearance to be measured may be wirelessly transmitted 70 to a remote computing device 72 by transmitter 32. The orientation information may then be further transmitted to a cloud platform 74. The cloud platform 74 may include a data storage or a data calculation platform, such as iCloud or Predix. From the cloud platform 74, trending data from previous measurements may be downloaded remotely and may indicate current gap measurement, gap measurement locations, and when changes may have occurred.

Figure 5:
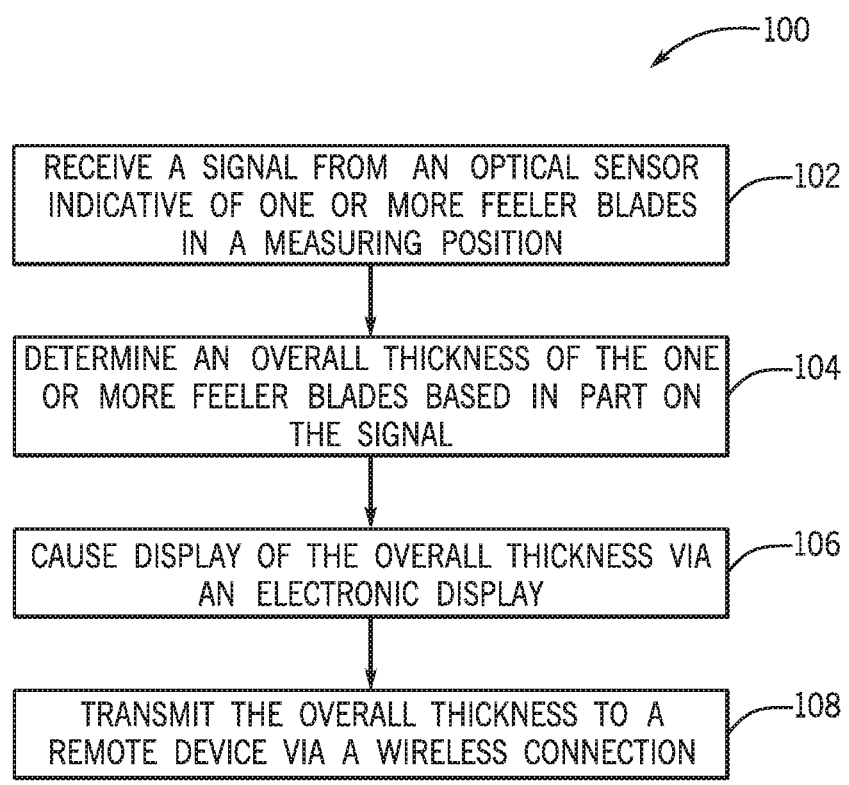
FIG. 5 is a flow diagram of a method of determining and transmitting gap measurement data that instructions in a memory of an embodiment of the feeler gauge of FIG. 1 may cause a processor of the feeler gauge to perform.

FIG. 5 is a flow diagram of the method 100 of determining and transmitting gap measurement data that the processor 28 performs based at least in part on instructions stored in the memory 30 of the feeler gauge 10. In some embodiments, the instructions in the memory 30 of the feeler gauge 10 may cause the processor 30 of the feeler gauge 10 to receive a signal from the optical sensor 24 (block 102). The signal may indicate that one or more feeler blades 14 are extended in the measuring position. For example, the signal may indicate which positions on a grid have detected light that has passed through the feeler blades 14 in a housed position. The instructions in the memory 30 of the feeler gauge 10 may further cause the processor 28 of feeler gauge 10 to determine an overall thickness of the one or more feeler blades 14 that are extended in the measuring position (block 104). As previously noted, the indications of thickness 22 of the feeler blades 14 may include a series of holes that form a grid with an obstruction or a missing hole at various possible hole locations, barcodes, quick response (QR) or RFID codes, a series of bumps or ridges, or any type of indicator that may be configured to be optically scanned by the optical sensor 24 of the feeler gauge 10. The determination of overall thickness may be based at least in part on the signal received from the optical sensor 24 of the feeler gauge 10. The determination of overall thickness may include looking up the overall thickness in a lookup table in the memory 30 of the feeler gauge 10 based on the indicators in the signal. For instance, the processor 28 may map each detected light location to a thickness directly performing arithmetic to add the thicknesses together. Alternatively, the processor 28 may map a combination of light locations to a specific thickness to forego future arithmetic computations. Alternatively, the determination of thickness of the one or more feeler blades 14 extended in the measuring position may include decoding the signal from an optically scanned bar code or quick response (QR) or RFID code.

The instructions in the memory 30 of the feeler gauge 10 may further cause the processor 28 of the feeler gauge 10 to cause the determined overall thickness to be displayed via the electronic display 34 (block 106). The electronic display 34 may be used to display the overall thickness of the one or more feeler blades 14 in the measuring position. The electronic display 34 may further be used to display orientation information about the feeler gauge 10, such as an alert to the user when the measuring orientation does not match an expected orientation. The instructions stored in the memory 30 of the feeler gauge 10 may further cause the processor 28 of the feeler gauge 10 to cause wireless transmission 70 of the determined overall thickness of the one or more feeler blades 14 in the measuring position and/or orientation information from the orientation sensor 26 via the transmitter 32 over a wireless connection (block 108). The determined overall thickness and/or orientation information may be transmitted to a remote computing device 72. The wireless connection used for the wireless transmission 70 may be an 802.11 wireless connection, an 802.15.4 wireless connection, a Bluetooth wireless connection, a Bluetooth low energy (BLE) wireless connection, or any combination thereof.

Technical effects of the disclosed embodiments include enabling quick and accurate gap measurement. The feeler gauge is configured to optically scan the indications of thickness via the optical sensor, enabling greater accuracy in measurement as opposed to manual determination. The memory and processor of the feeler gauge further enable increased accuracy in determination and calculation of measured gaps. The orientation sensor of the feeler gauge is configured to recognize the position of the feeler gauge as a measurement is being made and alert the user if the position does not match an expected position, enabling increased accuracy in location of measurement. Further, the feeler gauge is configured to wirelessly transmit gap measurement, orientation, and/or location information to any remote device. The wireless transmission capability enables remote access to current and trending data.

This written description uses examples to disclose the concepts discussed herein, including the best mode, and also sufficient disclosure to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A feeler gauge comprising:
a plurality of feeler blades, wherein each feeler blade of the plurality of feeler blades rotates about an axis between a measuring position and a non-measuring position, and each of the plurality of feeler blades comprises:
a measurement portion configured to be inserted into a gap to be measured; and
a proximal end having an indication of thickness of the respective feeler blade of the plurality of feeler blades thereon, wherein the indication of thickness comprises an obstruction configured to block light, and the indication of thickness comprises a plurality of holes arranged in a grid of possible hole locations, and the obstruction corresponds to a location where no hole exists for a possible hole location; and
an optical sensor that optically determines one or more feeler blades of the plurality of feeler blades that are deployed in the measuring position from the respective indications of thickness of each of the one or more feeler blades.

2. The feeler gauge of claim 1 wherein optically determining one or more feeler blades of the plurality of feeler blades that are deployed comprises determining which of the plurality of feeler blades remain in a housed position to indirectly determine which of the plurality of feeler blades has been deployed.

3. The feeler gauge of claim 1, wherein the optical sensor comprises:
an emitter configured to emit light; and
a detector configured to detect the emitted light from the emitter unless the obstruction of a feeler blade of the plurality of feeler blades blocks the emitted light from the detector.

4. The feeler gauge of claim 1, wherein the optical sensor comprises a plurality of emitters configured to emit light and, wherein each emitter of the plurality of emitters is located in a position configured to transmit light to a possible hole location of the possible hole locations.

5. The feeler gauge of claim 1, wherein each feeler blade of the plurality of feeler blades has an obstruction at a different possible hole location within the grid than obstructions of other feeler blades of the plurality of feeler blades.

6. The feeler gauge of claim 1 comprising a processor configured to determine an overall thickness of the one or more feeler blades.

7. The feeler gauge of claim 1 comprising a gyroscope configured to determine an orientation of the feeler gauge.

8. The feeler gauge of claim 7 comprising a display configured to display an overall thickness of the one or more feeler blades, wherein the display is configured to display a warning when the orientation does not match an expected orientation corresponding to an expected measuring location.

9. The feeler gauge of claim 1, wherein each indication of thickness comprises a bar code or a quick response (QR) or an RFID code that indicates the thickness of the respective feeler blade of the plurality of feeler blades.

10. A tangible, non-transitory, and computer-readable medium having instructions stored thereon that, when executed by a processor, are configured to cause the processor to:
receive a signal from an optical sensor indicative of one or more feeler blades of a feeler gauge that are deployed in a measuring position, wherein the signal is based at least in part on an optical sensing of a plurality of holes and obstructions, wherein the plurality of holes is arranged in a grid of possible hole locations on undeployed feeler blades with each of the undeployed feeler blades having a corresponding obstruction at a possible hole location that when optically detected using the optical sensor indicates that a corresponding undeployed feeler blade has not been deployed in the measuring position;
determine an overall thickness of the one or more feeler blades based at least in part on the signal; and
cause display of the overall thickness via an electronic display.

11. The tangible, non-transitory, and computer-readable medium of claim 10, wherein the instructions are configured to cause the processor to transmit the overall thickness to a remote device via a wireless connection.

12. The tangible, non-transitory, and computer-readable medium of claim 11, wherein the wireless connection comprises an 802.11 wireless connection, an 802.15.4 wireless connection, a Bluetooth wireless connection, a Bluetooth low energy (BLE), or any combination thereof.

13. The tangible, non-transitory, and computer-readable medium of claim 10, wherein determining the overall thickness of the one or more feeler blades comprises looking up the overall thickness in a lookup table in memory based at least in part on the signal from the optical sensor.

14. A feeler gauge configured to measure a thickness of a gap, wherein the feeler gauge comprises:
a housing;
a plurality of feeler blades configured to rotate about an axis between a measuring position and a housed position within the housing, wherein each of the feeler blades of the plurality of feeler blades comprises an optical indication of thickness of the respective feeler blade;
an optical sensor configured to detect the optical indications of thickness;
an orientation sensor configured to detect an orientation of the feeler gauge; and
a display configured to display an overall thickness of feeler blades of the plurality of feeler blades that are in the measuring position.

15. The feeler gauge of claim 14, wherein the optical sensor comprises:
an emitter configured to emit light; and
a detector configured to detect light when a respective feeler blade of the plurality of feeler blades is in the measuring position, wherein the optical indication of thickness of the respective feeler blade comprises an obstruction configured to block the emitted light from the detector while the respective feeler blade is in the housed position.

16. The feeler gauge of claim 14, wherein the orientation sensor comprises a gyroscope.

17. The feeler gauge of claim 14, wherein the display is configured to display a warning when the orientation does not match an expected orientation.

\* \* \* \* \*